UNITED STATES PATENT OFFICE.

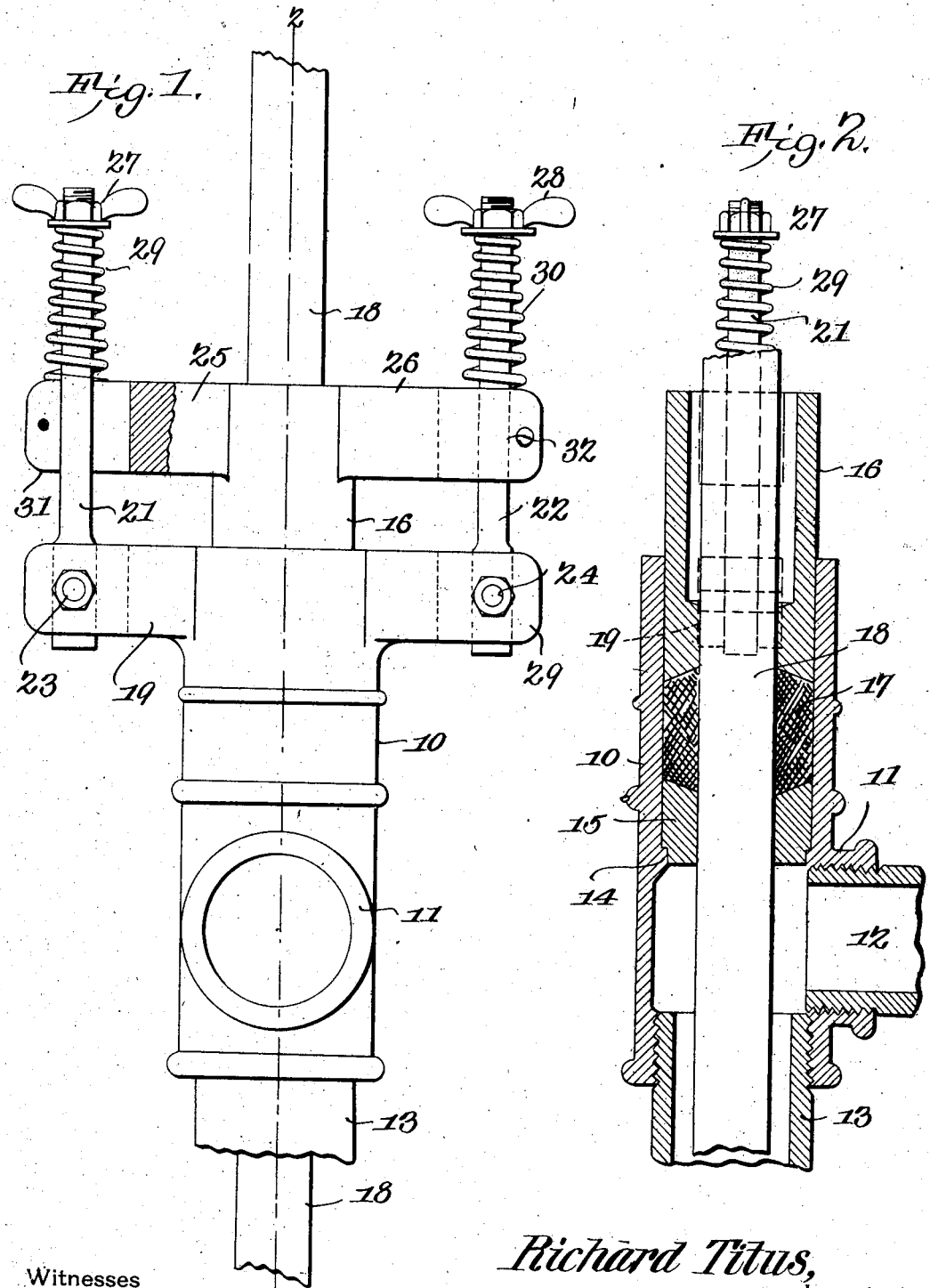

RICHARD TITUS, OF BOWLING GREEN, OHIO.

STUFFING-BOX.

No. 834,337.   Specification of Letters Patent.   Patented Oct. 30, 1906.

Application filed November 8, 1905. Serial No. 286,433.

*To all whom it may concern:*

Be it known that I, RICHARD TITUS, a citizen of the United States, residing at Bowling Green, in the county of Wood and State of Ohio, have invented a new and useful Stuffing-Box, of which the following is a specification.

This invention relates to the packing for pump-rods and similar devices, more particularly for oil-well pumps, and has for its object to improve the construction and increase the efficiency of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportion, and minor details of construction may be resorted to without departing from the principle or sacrificing any of the advantages of this invention within the scope of the appended claims.

In the drawings, Figure 1 is a side elevation, partly in section, of the improved device. Fig. 2 is a section on the line 2 2 of Fig. 1.

In the operation of oil-wells and similar structures the tubular lining is utilized as a pump-casing, and the pump-rod, which is sometimes called the "polish-rod," operates within this tubular lining, the latter being provided with a "stuffing-box" or packing at the upper end, through which the rod passes. The tubular member is also provided with a lateral branch through which the oil or other liquid is conducted when elevated by the pump, and heretofore the head member carrying the stuffing-box or packing and this lateral branch have been constructed separately and united by threaded couplings. The tubular linings and the branch conductor-pipes are seldom in alinement, and to connect the branch member to the tubular member generally requires much time and labor.

In the improved device herein disclosed the stuffing-box or packing-head and the socket for the lateral branch are in one piece and the fastening mechanism for the gland so arranged that the parts are not separated when the gland is loosened for the removal of the rod.

The improved device comprises a body member 10, having an integral lateral socket 11, internally threaded to receive the branch pipe 12 for conducting the liquid from the pump-tube and internally threaded at the lower end to receive the upper threaded end of the pump-tube, (represented at 13.) The body 10 is provided with an internal shoulder 14 to support a bushing 15, while the gland member 16 is slidably disposed in the upper part of the body and adapted for compressing the packing 17 upon the rod 18 and between the gland and bushing. Extending laterally from the body 10 are arms 19 and 20, with recesses in the outer ends in which clamp-bolts 21 and 22 are pivoted to swing by bolts 23 and 24, and extending laterally from the gland 16 are similar arms 25 and 26, having recesses in the outer ends to receive the bolts when in their upper position, as shown in Fig. 1. The bolts are provided with wing-nuts 27 and 28 and with pressure-springs 29 and 30, bearing between the nuts and the arms 25 and 26 of the gland. The springs are preferably larger at the lower ends, or where they bear upon the arms 25 and 26, as shown, and increase their power and also to extend the bearing-surface. Cotter-pins 31 and 32 are disposed through the arms 25 and 26 outside the bolts 21 and 22 to prevent accidental displacement of the bolts. The gland is thus yieldably supported in position and its force easily controlled by the thumb-nuts. The springs being located above the gland are not in position to be flooded by leakage from around the gland, as all such leakage flows away from the bolts and the springs upon the same. This is an important advantage, especially in pumps through which water containing salt or other substances or compounds detrimental to the metal.

When it is required to remove the rod 18, it is only necessary to remove the cotter-pins 31 and 32 and loosen the thumb-nuts 27 and 28 sufficiently to swing the bolts 21 and 22 outwardly upon their bolts 23 and 24 and raise the gland to any required distance to enable the lifting implement to be applied by resting upon the upper face of the body 10. Thus the rod may be removed from the pump without detaching the body 10 or the lateral branch, which is permanently attached thereto.

Having thus described the invention, what is claimed is—

1. In a device of the class described, a body surrounding the polish-rod of a pump and having means at one end for engagement to a pump, a packing-gland movably disposed in the other end of said body and operative upon said polish-rod, arms extending laterally in opposite directions from said body and with outwardly-opening recesses at the ends with pivoted bolts extending through the same, arms extending laterally in opposite directions from said gland and with outwardly-opening recesses at the ends, links swinging upon said pivot-bolts and extending through the recesses in the arms of said gland, nuts engaging said links, and pressure-screws between the nuts and the arms of said gland.

2. In a device of the class described, a body surrounding the polish-rod of a pump and having means at one end for attachment to a pump-tube, a packing-gland movably disposed in the other end of said body and operative upon said polish-rod, a socket for the discharge-pipe integral with said body and extending therefrom between the gland and pump-tube, arms extending laterally in opposite directions from said body and with outwardly-opening recesses at the ends with pivot-bolts extending laterally in opposite directions from said gland and with outwardly-opening recesses at the ends, links swinging upon said pivot-bolts and extending through the recesses in the arms of said gland, nuts engaging said links, and pressure-screws between the nuts and the arms of said gland.

In testimony that I claim the foregoing as my own I have hereto affixed my signature in the presence of two witnesses.

RICHARD TITUS.

Witnesses:
 BESSIE YOUNG,
 J. E. KELLY.